United States Patent
Hasch et al.

(10) Patent No.: US 12,504,367 B2
(45) Date of Patent: Dec. 23, 2025

(54) METHOD FOR DETERMINING RESIN PENETRATION INTO AT LEAST ONE POROUS COATING MATERIAL

(71) Applicant: Flooring Technologies Ltd., Kalkara (MT)

(72) Inventors: Joachim Hasch, Berlin (DE); Norbert Kalwa, Horn-Bad Meinberg (DE); Jinming Zhang, Berlin (DE)

(73) Assignee: Flooring Technologies Ltd., Kalkara (MT)

( * ) Notice: Subject to any disclaimer, the term of this patent is extended or adjusted under 35 U.S.C. 154(b) by 233 days.

(21) Appl. No.: 18/278,089

(22) PCT Filed: Feb. 15, 2022

(86) PCT No.: PCT/EP2022/053620
§ 371 (c)(1),
(2) Date: Aug. 21, 2023

(87) PCT Pub. No.: WO2022/179883
PCT Pub. Date: Sep. 1, 2022

(65) Prior Publication Data
US 2024/0125696 A1  Apr. 18, 2024

(30) Foreign Application Priority Data
Feb. 24, 2021 (EP) .................... 21158965

(51) Int. Cl.
*G01N 21/35* (2014.01)
*G01N 21/3563* (2014.01)
*G01N 21/359* (2014.01)
*G01N 33/44* (2006.01)

(52) U.S. Cl.
CPC ....... *G01N 21/359* (2013.01); *G01N 21/3563* (2013.01); *G01N 33/442* (2013.01); *G01N 2201/127* (2013.01)

(58) Field of Classification Search
CPC ............. G01N 21/355; G01N 21/3563; G01N 33/442; G01N 2201/127
See application file for complete search history.

(56) References Cited

U.S. PATENT DOCUMENTS

| 2004/0195714 A1* | 10/2004 | Mbachu ................ B05B 12/126 156/64 |
| 2016/0123871 A1* | 5/2016 | Kalwa ................ G01N 21/3563 250/340 |
| 2018/0080867 A1* | 3/2018 | Denk ................... G01N 21/359 |

FOREIGN PATENT DOCUMENTS

| CN | 105334179 A | 2/2016 |
| EP | 3327424 A1 | 5/2018 |
| WO | 2007021235 A1 | 2/2007 |
| WO | 2015105456 A1 | 7/2015 |

* cited by examiner

*Primary Examiner* — Hugh Maupin
(74) *Attorney, Agent, or Firm* — The Webb Law Firm

(57) ABSTRACT

Provided is a method for determining the resin penetration into at least one porous coating material which is pressed with at least one carrier board and at least one resin layer arranged on the carrier board. During the pressing process the resin penetrates or rises into the at least one porous coating material.

19 Claims, 1 Drawing Sheet

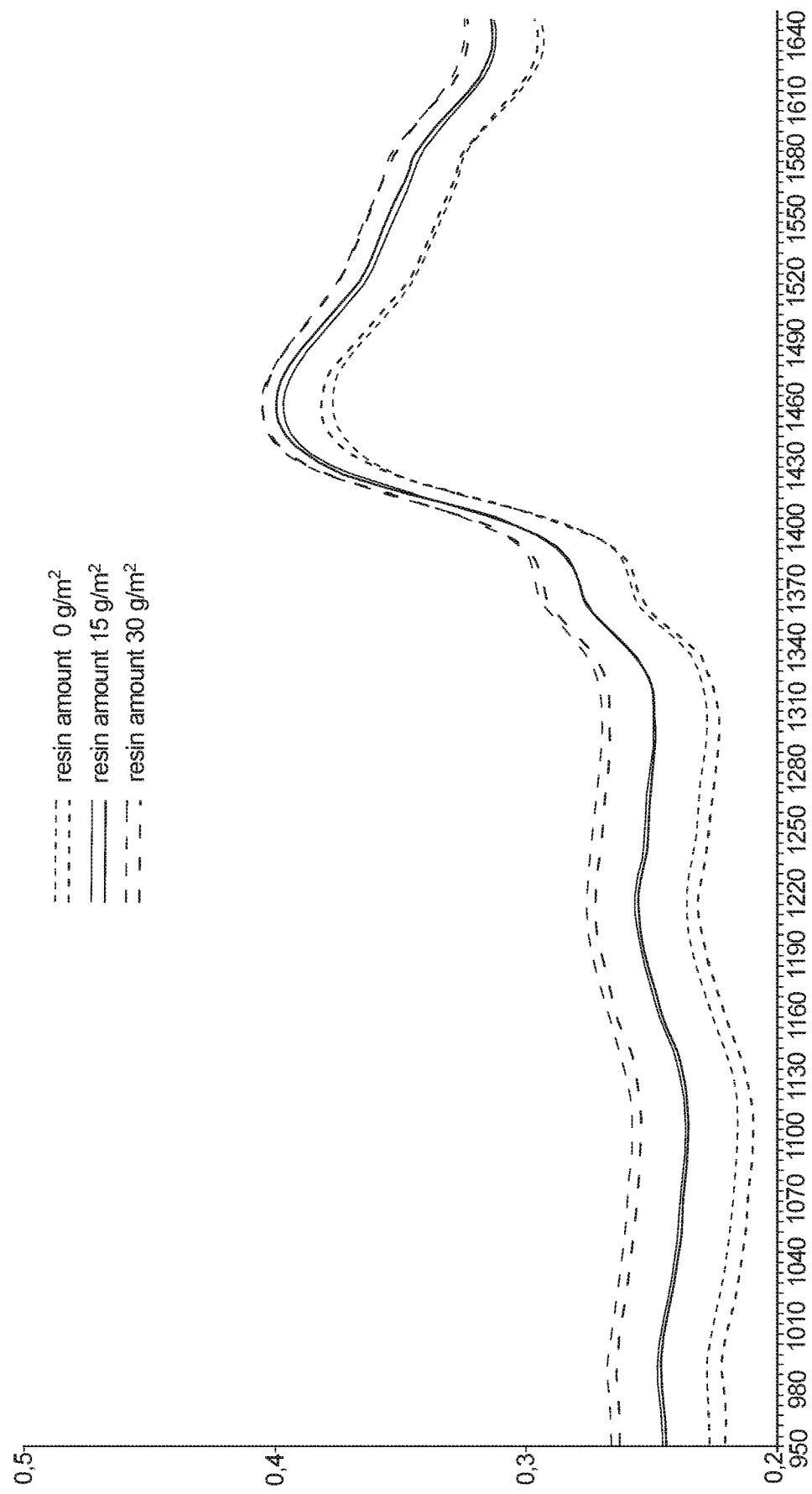

METHOD FOR DETERMINING RESIN PENETRATION INTO AT LEAST ONE POROUS COATING MATERIAL

CROSS-REFERENCE TO RELATED APPLICATIONS

This application is the United States national phase of International Patent Application No. PCT/EP2022/053620, filed Feb. 15, 2022, and claims priority to European Patent Application Number 21 158 965.0, filed Feb. 24, 2021, the disclosures of which are hereby incorporated in their entireties.

BACKGROUND OF THE INVENTION

Field of the Invention

The disclosure relates to a method for determining resin penetration into at least one porous coating material which is pressed with at least one carrier board and at least one resin layer arranged on the carrier board, wherein during the pressing process the resin penetrates or rises into the at least one porous coating material.

Description of Related Art

Floor coverings are increasingly being provided with various coating materials such as leather, felt or real wood to meet increased customer demands.

Various technologies are used in the production of floor coverings with a real wood surface. One approach is to glue relatively thick real wood veneers up to several millimetres thick onto transverse layers of wood. Layers of wood transverse to the middle layer are used as underlays.

Another approach is to replace the wood layers with wood-based materials. In this case, a real wood veneer is glued onto a wood-based material carrier (HDF, chipboard, OSB, etc.). The veneers used here are typically thinner, which results in lower mechanical strength than relatively thick veneers.

The advantage of using thin real wood veneers is the cheaper production and material costs. However, the use of veneers requires a suitable surface finish. A possible surface finish usually consists of a varnish based on UV or ESH varnishes.

Urea or PVAc glues with hardener are usually used to bond the veneers to the substrate. On the reverse side of the product, there is usually a veneer-based backing, which is intended to ensure tension symmetry in the product. Furthermore, this also adds to the aspect of a wooden floor.

One problem with this product is the limited possibility of repairing the product if it is damaged. This is all the more serious because the mechanical stability of the veneer layer is not particularly high due to the low bulk density of the veneer ($300$-$500$ $kg/m^3$). In the event of mechanical damage, e.g. by falling objects, deep indentations are therefore quickly created in a product of this type.

A solution to this problem is provided by WO 2015/105456 A1, in which a mixture of wood flour and melamine resin powder is spread onto a wood-based panel and then pressed onto the wood-based panel together with a veneer. Here, the greatest possible penetration of the melamine resin is desired, but direct control of the penetration level of the resin into the veneer is not possible.

The problems described above with regard to glued veneers are also essentially eliminated by a new technology. In this process, the veneer is pressed onto the wood-based substrate in a short-cycle press with the aid of a paper impregnated with melamine resin (e.g. an overlay). The pressing parameters are approx. T>$150°$ C., p>$30$ bar and t>$30$ sec. This technology can also be used to produce veneer flooring with veneers that are approx. $0.5$ mm thick. It is of decisive importance that the melamine resin rises as far as possible into the veneer during the pressing process. On the one hand, this reinforces the veneer with the synthetic resin and, on the other hand, the veneer, compressed by the pressing, is fixed in this state. However, the melamine resin should not escape from the veneer, as this would lead to discolouration of the surface and adhesion problems during subsequent varnishing or oiling.

One problem is that the quality of the reinforcement (i.e. the rising of the melamine resin into the veneer) cannot be determined non-destructively or on-line. This is all the more serious because, depending on the collection or usage class, both different wood veneers and different veneer thicknesses are processed. In addition, veneers of the same wood species from different regions can differ in terms of their properties.

This results in the following disadvantages: no non-destructive testing of the process possible; higher costs due to quality determination and readjustments to pressing parameters necessary.

SUMMARY OF THE INVENTION

The proposed solution is therefore based on the technical object of developing a non-destructive method that enables the degree of resin penetration in porous coating materials, such as veneers, to be determined. The method should provide results as quickly as possible so that the downtimes in production due to the quality determination are as short as possible or even non-existent. The resin penetration should already be possible directly behind the press and enable continuous monitoring of this parameter.

This object is solved by a method with features as described herein.

Accordingly, there is provided a method for determining the resin penetration (or penetration level/penetration amount of the resin) into at least one porous coating material, wherein the at least one porous coating material is pressed with at least one carrier board and at least one resin layer disposed on the carrier board, and wherein during the pressing process the resin penetrates or rises into the at least one porous coating material. The present method comprises the following steps:

Recording of at least one NIR spectrum of several reference samples, each having different values for resin penetration into a porous coating material, using at least one NIR measuring head in a wavelength range between $500$ nm and $2500$ nm, preferably between $700$ nm and $2000$ nm, in particular preferably between $900$ nm and $1700$ nm, and particularly advantageously between $1450$ nm and $1550$ nm;

Determining the resin penetration into the porous coating material of the mentioned reference samples by means of a mechanical removal of the porous material surface;

Correlating the resin penetration determined by mechanical removal with the recorded NIR spectra of said reference samples; and Creating a calibration model for the correlation between the spectral data of the NIR spectra and the corresponding resin penetrations of the reference samples by means of multivariate data analysis;

Pressing of at least one porous coating material with at least one carrier board and at least one resin layer arranged on the carrier board, Recording at least one NIR spectrum of the porous coating material pressed with the carrier board and the resin layer using the at least one NIR measuring head in a wavelength range between 500 nm and 2500 nm, preferably between 700 nm and 2000 nm, in particular preferably between 900 nm and 1700 nm and particularly advantageously between 1450 nm and 1550 nm; and Determining the resin penetration into the at least one porous coating material by comparing the NIR spectrum recorded for the porous coating material with the calibration model created.

According to the present method, an NIR spectrum of the porous material surface is recorded. NIR radiation is generated and directed onto the sample of substrate material with the material surface to be analysed, where the NIR radiation interacts with the constituents of the sample and is reflected or scattered. An NIR detector captures the reflected or scattered NIR radiation and generates an NIR spectrum that contains the desired chemical information of the sample. In this measurement, a large number of individual NIR measurements are carried out in one second, so that statistical validation of the measured values is also ensured. The NIR spectroscopy together with the multivariate data analysis (mentioned below) offers a possibility to establish a direct relationship between the spectral information (NIR spectra) and the parameters to be determined of the applied porous coating material, e.g. a veneer layer.

The present method takes advantage of the fact that the NIR radiation does not penetrate through the substrate, but is reflected or scattered at the surface of the substrate. The reflected or scattered NIR radiation is detected by the NIR detector and the determined NIR spectrum is used to determine the desired parameters (here penetration height of the resin into the coating material).

The recorded NIR spectrum, in combination with a test of the percentage of penetration via mechanical removal of the porous material surface, makes it possible to generate a correlation.

Surprisingly, it has been shown that depending on how far the resin, e.g. melamine resin, rises into the porous coating material, a signal increase for the melamine peak can be observed.

First of all, reference samples of a carrier board pressed with a porous coating material and resin layer are provided. It is essential that the reference sample is similar to the sample to be measured, i.e. in particular the resin layer and porous coating material of the reference sample have the same composition as the resin layer and porous coating material to be measured. The similarity of the sample to be measured and the reference sample is particularly important when using resin layers with additives such as flame retardants, fibres and other additives.

At least one NIR spectrum is recorded from these reference samples in a wavelength range between 500 nm and 2500 nm, preferably between 700 nm and 2000 nm, in particular preferably between 900 nm and 1700 nm.

These reference samples are also subjected to non-spectroscopic analysis to determine the desired parameters, i.e. in the present case mechanical removal of the porous material surface.

A mean value is formed from the parameters for the reference samples determined in each case by means of the non-spectroscopic analysis, which is then assigned to the respective recorded NIR spectra of these reference samples, and a calibration model is created for the relationship between the spectral data of the NIR spectra of the reference samples and the associated parameter values by means of a multivariate data analysis; i.e. an NIR spectrum of the reference sample corresponds to each parameter value of the reference sample. The calibration models created for the various parameters are stored in a suitable data memory.

Subsequently, at least one porous coating material is pressed with the resin layer and the carrier board and at least one NIR spectrum of the pressed porous coating material is recorded. The desired parameter of the porous coating material (here the resin penetration or penetration height into the porous coating material) can then be determined by comparing the NIR spectrum recorded for the pressed porous coating material with the calibration model created.

It is thus possible to simultaneously determine several parameters of interest of the porous coating material pressed with the carrier board from a single NIR spectrum determined for the sample to be measured by an automated comparison or alignment with the calibration models created for the respective parameters.

It makes sense to compare and interpret the NIR spectra over the entire recorded spectral range. This is advantageously carried out with a multivariate data analysis (MDA) known per se. In multivariate analysis methods, several statistical variables are typically examined simultaneously in a manner known per se. For this purpose, the number of variables contained in a data set is usually reduced without simultaneously reducing the information contained therein.

In this case, the multivariate data analysis is carried out using the partial least squares regression (PLS) method, which allows a suitable calibration model to be created. The evaluation of the data obtained is preferably carried out with suitable analysis software, such as the analysis software SIMCA-P from Umetrics AB or The Unscrambler from CAMO.

In another embodiment, it is intended to use spectral data from the NIR spectral range between 1450 and 1550 nm for the creation of the calibration model, which are pre-treated by means of suitable mathematical methods and then fed to the multivariate data analysis.

The significance of a wavelength for the prediction of parameters of the pressed porous coating material, such as the resin penetration, from the NIR spectrum is shown with the help of the regression coefficients. The regions with large coefficient amounts have a strong influence on the regression model. For example, the representation of the regression coefficients in a PLS regression model for the determination of the amount of resin shows that the wavelength range between 1460 nm and 1530 with a maximum at 1490 nm (absorption band of the amino groups of the resin) is the most important for the calculation of the model, as the amounts of the regression coefficients are largest here. The other ranges in the spectrum have less information content in relation to the NIR measurement, but still help to take into account or minimise the other information or interfering influencing variables (such as transparency of the layer, surface properties of the resin layer or the substrate material, etc.).

To eliminate interfering influences (such as the nature of the surface of the substrate or the porous coating material, the colour of the samples, light scattering from solid particles or other additives, etc.), it is necessary to process the spectral data using mathematical pre-treatment methods (e.g. derivative data pre-treatment, standardisation according to SNVT (Standard Normal Variate Transformation), multiplicative signal correction (EMSC, Extended Multiplicative Signal Correction, etc.). In this process, the baseline effects, which are mainly caused by the different colour of the samples, are removed from the spectra, overlapping bands are separated from each other and the dependence of light scattering on the substrate surface is taken into account. Thus, data pre-treatment is preferably done to reduce light scattering from the rough surface of the substrate. During measurement, the focus of calibration and data pre-treatment is on removing baseline shift.

From the pre-treated data, a calibration model is developed using multivariate data analysis, which includes all decors used in the calibration.

Accordingly, the comparison and interpretation of the NIR spectra is preferably carried out in the spectral range between 1450 and 1550 nm using multivariate data analysis MDA. In multivariate analysis methods, several statistical variables are typically examined simultaneously in a manner known per se. For this purpose, the number of variables contained in a data set is reduced without simultaneously reducing the information contained therein.

In the present method, a series of pressing was carried out to establish the correlation, in which an HDF (fibreboard with increased bulk density) was coated with different amounts of liquid and subsequently dried melamine resin. Then a porous coating material, e.g. an oak veneer with a thickness of 0.5 mm, was placed on this HDF and pressed. NIR spectra were taken of these samples. This showed that the melamine resin peak was more or less pronounced, depending on the penetration. The penetration height of the melamine resin into the porous material was then determined by mechanical removal of the porous material and correlated with the NIR spectra. For better visualisation of the resin or the resin front, the resin can be coloured, but this does not interfere with the NIR spectroscopy.

During pressing (hot pressing), pressure and temperature cause the polycondensation reaction in which the resin, especially melamine resin, hardens. For this purpose, the resin is transferred from state b (partially condensed, still meltable and curable) to state c (fully condensed and cured). In between, it is liquid and this is exploited to enable rising and observed/evaluated here with NIR.

The present method enables the provision of the measured values in a short time (online, preferably without disturbing time delay) compared to conventional (known) measuring methods. The measurement data can be used for quality assurance, research and development, process control, regulation, control, etc. The measurement process does not reduce the production speed, etc. Basically, it improves the monitoring of production. In addition, downtimes due to quality determinations and plant adjustments are also reduced.

The advantages of the present method are manifold: non-contact multi-parameter determination ("real time" or "real-time" measurement) with significantly reduced time delay in the evaluation of the measured parameter values; improved plant control or regulation, reduction of rejects, improvement of the quality of the products manufactured on the plant, improvement of the plant availability.

In one embodiment of the present method, the at least one resin layer comprises a resin-impregnated paper layer, a resin-containing powder or a resin-containing liquid. Accordingly, the applied resin layer may be present as a powder or liquid overlay or as a partial or full impregnate of a paper layer on the substrate.

Resin-Impregnated Paper Layer (Overlay)

The resin impregnated paper layer is typically based on a cellulosic layer with an average sheet weight of 18-50 $g/m^2$, preferably 20-30 $g/m^2$, e.g. 25 $g/m^2$.

Such cellulosic layers are impregnated with thermosetting resins as binders, such as formaldehyde resins, especially melamine resin, phenolic resin, urea resin or mixtures of these resins. Such paper layers are also known as overlays.

Aqueous resin solutions with a resin solids content of between 40 and 80% by weight, preferably between 50 and 65% by weight, are used to impregnate the paper layers.

The resin is applied in an amount of 200% to 600%, preferably 250% to 400% solids content based on the basis weight of the paper layer. The resin is applied in an amount sufficient to allow the resin to penetrate the porous coating material at least in sections during the pressing process.

For impregnation, the paper layer is unrolled from an unwinding station, drawn through an impregnation bath with liquid resin and impregnated. This is followed by drying in a floating dryer and rewinding or formatting of the resin-impregnated paper.

In a preferred embodiment, it is possible to apply resin as a solid (e.g. as powder, dust, granules) to the not yet pre-dried and therefore still moist paper layer after the impregnation step. This can be done, for example, by spraying with tribo guns. The amounts of resin applied, e.g. in the form of melamine resin powder, can be between 10 and 50 $g/m^2$, preferably between 15 and 30 $g/m^2$. The amount of solid resin applied to the paper layer, e.g. in the form of melamine resin powder, is determined by the penetration height of the resin in the porous coating material to be achieved.

After applying the resin to the paper layer, especially after impregnating the paper layer with the resin, the surface is merely pre-dried and thus still sticky. This sticky state is reached at a content of volatile substances with a residual moisture (VC value) of 10-15%. The VC value is determined as the difference between the initial weight and the final weight after drying at 105° C. until the weight is constant.

The sticky surface of the resin-impregnated paper layer simplifies the application of additives for further finishing of the porous coating material, such as a veneer layer.

Powder Resin (Powder Overlay)

In case of using powdered resin, the amount of powdered resin applied to the surface of the carrier board is 50-150 $g/m^2$, preferably 60-100 $g/m^2$, more preferably 70-80 $g/m^2$. The amount of resin used is determined by the bonding properties and the desired penetration level of the resin into the porous coating material.

The powdered resin used has a scattering density of 0.5 to 1.5 kg/l, preferably 0.8 to 1.0 kg/l, and an average particle size of 10 to 50 µm, preferably 20 to 30 µm, more preferably 25 µm.

The powdered resin used here has only small traces of moisture. A moisture content of 0.5% should not be exceeded, otherwise lumps will form and spreading will no longer be possible.

In a further variant of the present method, the surface or side of the carrier board to be sprinkled with the powdered resin is pretreated before sprinkling the powdered resin to improve the adhesion of the powdered resin to the surface of the carrier board. This pre-treatment may include applying moisture to the side or surface or electrostatically charging the side or surface of the carrier board.

The powdered resin used is a formaldehyde resin, preferably a urea resin, a melamine resin or a phenolic resin, more preferably a melamine-formaldehyde resin, a melamine-phenol-formaldehyde resin or a melamine-urea-formaldehyde resin.

The powdered resin is preferably applied using a scattering apparatus. Spreading is preferably carried out in a continuous process. A suitable spreading device is the precision spreader "Oscillating Brushing System" from TPS. However, electrostatic application with a tribo gun is also possible.

This further layer to be applied can only consist of a powdery resin, or it is also possible to use a mixture containing the resin, natural and/or synthetic fibres, and possibly other additives.

The powder is composed of 30 to 65% by weight, preferably 40 to 60% by weight of fibres, 20 to 45% by weight, preferably 30 to 40% by weight of binder, and 0 to 8% by weight, preferably 0.5 to 6% by weight of additive. The natural and/or synthetic fibres are preferably selected from a group of bleached cellulose fibres or organic polymer fibres.

Liquid Resin (Liquid Overlay)

In the case of using liquid resin as a resin layer, the amount of liquid resin applied to the surface of the carrier board is between 50 and 150 g/m$^2$, preferably between 60 and 100 g/m$^2$, more preferably between 70 and 80 g/m$^2$, the solids content of the resin being about 65% by weight and containing the usual auxiliaries such as hardeners, wetting agents, etc.

The liquid resin used is a formaldehyde resin, preferably a urea resin, a melamine resin or a phenolic resin, more preferably a melamine-formaldehyde resin, a melamine-phenol-formaldehyde resin or a melamine-urea-formaldehyde resin.

As in the case of the resin powder, the liquid resin can also be used in a mixture with natural and/or synthetic fibres, and possibly other additives.

Additive

As mentioned above, according to the present method, at least one additive may be applied to or incorporated in the at least one resin layer.

In a preferred embodiment, at least one additive is applied to the (preferably sticky) surface of the resin layer, e.g. the resin-impregnated paper layer. The additive can be applied in liquid or solid form, in particular as a particulate solid (dust, powder, granules), or as a liquid or paste to the paper layer, for example by spraying, spraying, pouring, doctoring, rolling, sprinkling.

One additive or mixtures of several additives can be used, whereby several additives can also be applied one after the other.

The additives used may be selected from the following group: Dyes (ink), pigments (e.g. colour pigments, metallic pigments or reflective pigments) flame retardants (e.g. ammonium polyphosphate, tris(tri-bromine neopentyl) phosphate, zinc borate or boric acid complexes of polyhydric alcohols), agents to increase conductivity, UV stabilisers, bleaching agents, hydrophobing agents or antimicrobial agents.

Possible antimicrobial active substances may include at least one biocide. A prerequisite for the selection of a suitable biocide is that it complies with EU Regulation No. 528/2012 concerning the placing of biocidal products on the market. Biocides can be classified either according to product types such as disinfectants and protective agents or according to their target organisms (virucides, bactericides, fungicides, etc.). Presently, the at least one biocide may be selected from a group comprising benzalkonium chloride, octylammonium chloride, chitosan, phenylphenol, copper sulphate, silver nitrate, lactic acid, nonanoic acid, sodium benzoate, 1-[[2-(2,4-dichlorophenyl)-4-propyl-1,3-dioxolan-2-yl]methyl]-1H-1,2,4-triazoles, 2-octyl-2H-isothiazol-3-ones, thiazol-4-yl-1H-benzoimidazoles, 3-iodo-2-propynylbutylcarbamate, biphenyl-2-ol, bronopol/calcium magnesium oxide, copper (II) oxide, 2-pyridinethiol-1-oxide, silver oxide, silver-copper zeolite. The active substances listed are from product families 2 and 9, which have already been approved or are in the process of being approved for antiviral floors.

Preferably, the additive is not soluble or homogeneously soluble in the resin provided on the surface of the paper layer. This ensures that the additive does not mix with the resin but remains on the surface and can thus come into contact with and penetrate the porous coating material.

Carrier Board

In one embodiment of the present method, the at least one carrier board is a board made of a wood-based material, in particular a particle board, medium-density fibre board (MDF), high-density fibre board (HDF), oriented strand board (OSB) or plywood board, made of plastic, a wood-based material-plastic mixture or a composite material, a cement fibre board, gypsum fibre board or a WPC board (wood plastic composites) or an SPC board (stone plastic composites).

The surface of the carrier material can be surface-treated. Also, the surface of a wood-based carrier board can be sanded (without press skin) or non-sanded (with press skin). In the case of a plastic carrier board, the surface may be corona-treated.

Porous Coating Material

The at least one porous coating material may be selected from the following materials: a veneer layer, a leather material, felt material, non-woven material and other fabric materials. In particular, materials are included which have a porosity in which liquid resin can rise during pressing and which are at least partially plastically deformable.

In the case of using a veneer layer, in one embodiment this comprises at least one layer of real wood veneer.

In a more advanced embodiment, the at least one veneer comprises at least one real wood layer having a thickness between 0.2-10 mm, preferably 0.5-5 mm, more preferably 0.5-2 mm. The veneer may be made in one piece from a log, for example by peeling. However, it can also be composed of individual pieces which are joined together, for example, by binding agents or so-called glue threads. The veneer preferably has the dimensions of the carrier board. The veneer has a lower side facing the carrier board and an upper side facing away from the carrier board.

In the case of using leather material, e.g. as an insulating layer, a leather fibre material with a thickness between 0.5 mm and 1 mm, preferably 0.75 mm, is preferably used.

Leather material or leather fibre material is defined as a material made of shavings, e.g. chrome shavings and crushed, vegetable-tanned leather residues from the leather processing industry, binding agents, e.g. natural latex and natural fats. The proportion of leather in a leather fibre fabric is at least 50%. The processed leather residues can come from cattle or other animals such as horses.

In a further embodiment of the present method, the at least one carrier board, the at least one resin layer disposed on the carrier board and the at least one porous coating material are compressed at temperatures between 150 and 200° C., preferably between 170 and 180° C. at a pressure of 30 to 50 kg/cm$^2$, preferably 40 kg/cm$^2$ for 30-120 seconds, preferably 60 to 90 seconds.

The present method thus enables the determination of the degree of penetration of resin into a porous coating material pressed with a carrier board with the following layer structures:
- a) wood-based board—resin-impregnated paper layer (overlay)—if applicable resin powder—additives, porous coating material,
- (b) wood-based board—resin powder (powder overlay)—additives, porous coating material, or
- c) wood-based board—liquid resin (liquid overlay)—additives, porous coating material.

The NIR measurement of the penetration height of the resin into the porous coating material can be determined in one variant continuously within, i.e. online, the production line of the material boards. In this online variant, the penetration level is determined during the production process. This enables direct control and intervention in the production process.

In a second embodiment of the present method, the penetration height can also be determined outside (i.e. offline) the production line of the material boards. In this variant, a finished pressed material board is removed or discharged from the production line and measured offline, e.g. in a separate laboratory as part of routine quality control.

In another variant, the NIR measurement can be carried out both online and offline.

It can also be provided that the at least one NIR measuring head moves transversely to the direction of travel of the carrier boards pressed with the porous coating material. The NIR detector can be installed at any point in the transport direction of the board. The detector can also traverse the width of the board or analyse certain problem areas (e.g. in the edge or middle area of the boards, etc.). In addition, the measured values are immediately available and allow immediate intervention in the process. This is not readily possible with other methods.

The present method is carried out in a production line comprising at least one NIR multimeter head, preferably at least two NIR multimeter heads, and at least one control system. Such a production line may be a production line for manufacturing material boards. Preferably, the present method for determining the resin penetration into the porous coating material is performed continuously and online.

The control system of the production line comprises at least one computer-aided evaluation unit (or processor unit) and a database. In the evaluation unit, the NIR spectrum measured for the product (i.e. pressed porous coating material) is compared with the calibration models created for the individual parameters. The parameter data determined in this way are stored in the database.

The data determined with the present spectroscopic method can be used to control the production line. The parameter values of the NIR multi-measurement head measured without contact ("actual values") can be used directly and in "real time" for the control or regulation of the relevant plant, as already described, for example by storing the actual values measured and stored in the database, e.g. a relational database, and comparing them with target values of these parameters existing there. The resulting differences are then used to control or regulate the production line.

A computer-implemented method and a computer program comprising instructions which, when executed by a computer, cause the computer to execute the computer-implemented method, are provided for balancing and controlling the production line. The computer program is stored in a memory unit of the production line control system.

BRIEF DESCRIPTION OF THE DRAWING

The terms FIG., FIGS., FIGURE, and FIGURE are used interchangeably in the specification to refer to the corresponding FIGURES in the drawing.

The solution is explained in more detail below with reference to the FIGURE in the drawing using an example of an embodiment.

DESCRIPTION OF THE INVENTION

FIG. 1 shows an NIR spectrum of a veneer layer pressed with a resin layer and carrier board.

Example 1

Three 8 mm HDF (500×500 mm) were covered on one side with an overlay and black digital printing ink was applied to the overlay in a quantity of 10 g fl./m². The overlay had a paper weight of approx. 25 g/m² and a resin application of 400%.

Melamine resin powder was applied to the still wet overlay in quantities of 0, 15 and 30 g/m² on the three overlays. The overlays were dried in a fume cupboard.

An oak veneer (thickness: 0.5 mm) was then laid on top of the overlays. Then the structure was pressed in a laboratory press at 180° C., a pressure of 40 kg/cm² and a pressing time of 60 seconds. This compressed the veneer to a thickness of 0.35 mm.

Afterwards, samples were cut from the boards (100×100 mm, four pieces each). After cooling, the surface was measured with an NIR measuring head at four points that were marked by a coordinate cross and where the abrasion/removal by the Taber abraser would later take place.

These were then tested on a Taber abraser. The test was carried out in accordance with DIN EN 13329. The friction wheels of the taber-abraser were covered with the usual sanding papers and also loaded with the usual weights. Then, after 200 revolutions in each case, it was visually checked whether black discolouration could already be observed in the veneer. Then, using a dial gauge, the removal in mm was determined in the circular depression created by the sandpaper in the four circular segments formed by a coordinate cross, and the mean value was calculated from this. From this mean value, together with the four other samples, an overall mean value was formed. The removal was then subtracted from the veneer thickness, which was determined with the help of a microscope, and then correlated with the spectra.

The values determined are summarised in the following table 1. It can be seen that with higher amounts (30 g/m²) of melamine resin powder applied to the overlay paper, the mechanical removal in the Taber-Abraser test is lower than with 0 g/m² or 15 g/m² of resin powder. This proves that the more resin powder applied, the more resin penetrates the veneer ply and the less needs to be removed in the Taber-Abraser test to observe the black discolouration in the veneer ply.

The mechanical reduction in the Taber-Abraser test corresponds to the reduction determined by the NIR method, so that the NIR method allows verification of the penetration level of the resin in the veneer layer.

TABLE 1

| Amount of melamine resin applied | Decrease in mm NIR | Decrease in mm Taber Abraser | Difference in mm |
|---|---|---|---|
| Zero sample | 0.25 | 0.28 | 0.03 |
| 15 g melamine resin/m² | 0.12 | 0.15 | 0.03 |
| 30 g melamine resin/m² | 0.07 | 0.07 | 0 |

The measuring head for determining the resin penetration is installed directly behind the press used. By means of an automated displacement option, the measuring head can analyse different areas of a board coated with veneer or it can traverse over the board. This ensures that areas that can usually be problematic due to different pressing conditions (e.g. board edges) are also analysed.

If the penetration of the resin into the veneer is not adequate, an improved resin flow can be achieved by changing the pressing temperature and/or the pressing time. The two parameters are changed in opposite directions. If the pressing temperature is reduced, the pressing time is extended. For example, if the pressing temperature is reduced by 10° C., the pressing time is extended by 10 to 20 seconds.

Example 2

To check the accuracy of the calibration, a coating with a leather was carried out instead of a coating of a HWS with a veneer. First, a spectrum of the leather used was created with the help of an NIR measuring device to check whether the melamine peak at approx. 1500 nm was superimposed by peaks of the leather. Which was not confirmed.

An 8 mm HDF (500×500 mm) was covered with an overlay on one side. The overlay had a paper weight of approx. 25 g/m² and a resin application of 400%.

A brown leather (thickness: 0.75 mm) was then placed on the overlay. Then the overlay was pressed in a laboratory press at 180° C., a pressure of 40 kg/cm² and a pressing time of 60 seconds. This compressed the leather to a thickness of 0.45 mm.

Then samples were cut from the board (100×100 mm, four pieces each). After cooling, the surface was measured with an NIR measuring head at four points marked by a coordinate cross.

The measurement with the NIR measuring device showed a penetration depth of 0.35 mm. This was subsequently checked with the Taber abraser. A value of 0.35 was determined.

Other porous coating materials such as fabric, felt, fleece, etc. can also be measured using this method.

The invention claimed is:

1. A method for determining the resin penetration into at least one porous coating material which is pressed with at least one carrier board and at least one resin layer, wherein the at least one resin layer is arranged on the carrier board and the at least one porous coating material is arranged on the at least one resin layer, wherein during the pressing process the resin penetrates or rises into the at least one porous coating material, comprising the steps of
recording of at least one NIR spectrum of several reference samples each having different values for resin penetration into a porous coating material using at least one NIR measuring head in a wavelength range between 500 nm and 2500 nm;
determining the resin penetration into the porous coating material of the mentioned reference samples by means of a mechanical removal of the porous material surface;
correlating the resin penetration determined by mechanical removal with the recorded NIR spectra of said reference samples; and
creating a calibration model for the correlation between the spectral data of the NIR spectra and the corresponding resin penetrations of the reference samples by means of multivariate data analysis;
pressing of at least one porous coating material with at least one carrier board and at least one resin layer arranged on the carrier board,
recording at least one NIR spectrum of the porous coating material pressed with the carrier board and the resin layer using the at least one NIR measuring head in a wavelength range between 500 nm and 2500 nm; and
determining the resin penetration into the at least one porous coating material by comparing the NIR spectrum recorded for the porous coating material with the calibration model created.

2. The method according to claim 1, wherein the at least one resin layer comprises a resin-impregnated paper layer, a resin-containing powder or a resin-containing liquid.

3. The method according to claim 1, wherein the at least one resin layer comprises a resin-impregnated paper layer having resin powder applied thereto.

4. The method according to claim 3, wherein the resin powder is applied to the resin-impregnated paper layer in an amount between 10 and 80 g/m².

5. The method according to claim 3, wherein the resin powder is applied to the resin-impregnated paper layer in an amount between 15 and 50 g/m².

6. The method according to claim 1, wherein at least one additive is applied to the at least one resin layer.

7. The method according to claim 6, wherein the at least one additive is selected from the following group comprising dyes (e.g. ink), pigments (e.g. color pigments, metallic pigments or reflective pigments), flame retardants (ammonium polyphosphate, tris(tri-bromo neopentyl) phosphate, zinc borate or boric acid complexes of polyhydric alcohols), agents for increasing conductivity, UV stabilizers, bleaching agents, hydrophobing agents or antimicrobial agents.

8. The method according to claim 6, wherein the at least one additive is a dye.

9. The method according to claim 1, wherein the at least one carrier board is a board made of a wood material, of plastic, a wood material-plastic mixture or a composite material, a cement fibre board, gypsum fibre board or WPC board (wood plastic composites) or a SPC-board (stone plastic composites).

10. The method according to claim 9, wherein the wood material is a particle board, medium-density fibre (MDF)-, high-density fibre (HDF)-, oriented strand (OSB)- or plywood board.

11. The method according to claim 1, wherein the at least one porous coating material comprises at least one veneer layer, leather material, felt material, non-woven material and/or such materials which have a porosity in which liquid resin can rise during pressing and which are at least partially plastically deformable.

12. The method according to claim 1, wherein the at least one carrier board, the at least one resin layer disposed on the carrier board and the at least one porous coating material are compressed at temperatures between 150 and 200° C., at a pressure of 30 to 50 kg/cm².

13. The method according to claim 1, wherein spectral data from the entire recorded spectral range are used to create the calibration model.

14. The method according to claim 1, wherein spectral data from the NIR spectral range between 1450 nm and 1550 nm are used for the creating the calibration model, which are pre-treated by means of suitable mathematical methods and are subsequently fed to the multivariate data analysis.

15. The method according to claim 1, wherein the determination of the resin penetration into the porous coating material is carried out continuously and online.

16. The method according to claim 1, wherein the wavelength range is between 700 nm and 2000 nm.

17. The method according to claim 1, wherein the wavelength range is between 900 nm and 1700 nm.

18. The method according to claim 1, wherein the wavelength range is between 1450 nm and 1550 nm.

19. The method according to claim 1, wherein the at least one carrier board, the at least one resin layer disposed on the carrier board and the at least one porous coating material are compressed at temperatures between 17° and 180° C., at a pressure of 40 kg/cm$^2$ for 60 to 90 seconds.

\* \* \* \* \*